(12) United States Patent
Shioiri et al.

(10) Patent No.: US 9,683,618 B2
(45) Date of Patent: Jun. 20, 2017

(54) SELECTABLE ONE-WAY CLUTCH

(71) Applicant: TOYOTA JIDOSHA KABUSHIKI KAISHA, Toyota-shi, Aichi (JP)

(72) Inventors: Hiroyuki Shioiri, Yokohama (JP); Hideaki Komada, Gotemba (JP); Hiroyuki Shibata, Odawara (JP); Yuki Kurosaki, Susono (JP); Hiroki Yasui, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/961,052

(22) Filed: Dec. 7, 2015

(65) Prior Publication Data

US 2016/0160942 A1    Jun. 9, 2016

(30) Foreign Application Priority Data

Dec. 9, 2014 (JP) ................................. 2014-249251

(51) Int. Cl.
*F16D 41/14* (2006.01)
(52) U.S. Cl.
CPC .................... *F16D 41/14* (2013.01)
(58) Field of Classification Search
CPC ........ F16D 41/02; F16D 41/084; F16D 41/16; F16D 41/12; F16D 41/125; F16D 41/14; F16D 11/02; F16D 11/008
See application file for complete search history.

(56) References Cited

U.S. PATENT DOCUMENTS

| | | | |
|---|---|---|---|
| 8,844,693 B2 * | 9/2014 | Pawley | F16D 41/16 192/104 B |
| 2004/0118654 A1 * | 6/2004 | Robuck | F16D 41/12 192/46 |
| 2006/0237276 A1 * | 10/2006 | Jegatheeson | F16D 41/30 192/46 |
| 2009/0005212 A1 * | 1/2009 | Maguire | F16D 41/125 475/323 |
| 2010/0184559 A1 * | 7/2010 | Tang | B60K 6/383 477/5 |
| 2011/0263375 A1 * | 10/2011 | M N | F16D 41/084 475/269 |
| 2011/0297500 A1 * | 12/2011 | Shaw | F16D 41/12 192/46 |
| 2013/0062151 A1 | 3/2013 | Pawley | |

FOREIGN PATENT DOCUMENTS

WO    2013/040135 A1    3/2013

* cited by examiner

*Primary Examiner* — Stacey Fluhart
(74) *Attorney, Agent, or Firm* — Andrews Kurth Kenyon LLP

(57) ABSTRACT

An SOWC configured to prevent an unintentional engagement is provided. A pawl comprises a strut that is pushed up toward a notch through an aperture of a selector plate, a stopper plate protruding laterally from a rear end side of the strut, and a first inclined face formed on the stopper plate to incline downwardly from the rear end side toward the leading end side of the strut. A side plate is formed along each long side of the aperture to protrude toward the pocket plate, and the second inclined face is formed on the side plate to be brought into contact to the first inclined face.

3 Claims, 6 Drawing Sheets

SELECTABLE ONE-WAY CLUTCH

The present invention claims the benefit of Japanese Patent Application No. 2014-249251 filed on Dec. 9, 2014 with the Japanese Patent Office, the disclosure of which is incorporated herein by reference in its entirety.

BACKGROUND

Field of the Invention

Preferred embodiment relates to the art of a selectable one-way clutch adapted to selectively enable a torque transmission only in one direction and a torque transmission in both directions.

Discussion of the Related Art

PCT international publication WO2013/040135 describes an example of a selectable one-way clutch (to be abbreviated as "SOWC" hereinafter). In the selectable one-way clutch taught by WO2013/040135, a control plate is disposed between a rotatable pocket plate and a notch plate, and pawls is adapted to be projected to the notch plate side when apertures formed through the control plate is situated on corresponding site of the pawl held in the pocket plate. A leading end of each pawl is individually fitted into engagement with notches formed on the notch plate to bring the pocket plate into engagement with the notch plate. Consequently, a torque transmission between the pocket plate and the notch plate is enabled by rotating the notch plate relatively with the pocket plate. When the notch plate is rotated in the opposite direction, the pawl is pushed toward the pocket plate by the edge of the notch so that the pocket plate is brought into disengagement from the notch plate to disable the torque transmission therebetween. Consequently, the SOWC is brought into an over running state. The pawl is pushed into the pocket by further displacing the aperture from the pocket and so that the pawl is completely brought into disengagement from the notch. Consequently, the pocket plate and the notch plate are allowed to rotate relatively to each other in both directions.

That is, the control plate of the SOWC taught by WO2013/040135 is rotated by a relatively small actuator or spring to selectively push the struts into the pockets. Each clearance between those plates is rather narrow and hence lubricant is applied to the clearance to reduce friction. If the notch plate is rotated relatively with the pocket plate in the ratchet direction (opposite to the over running direction) in the SOWC in the overrunning state, the control plate may be rotated unwillingly by a drag torque resulting from such rotation to bring the strut into engagement with the notch. Especially, if a temperature of the lubricant is low and hence viscosity thereof is high, such drag torque to bring the strut into engagement unwillingly is increased.

Aspects of preferred embodiment has been conceived noting the foregoing technical problems, and it is therefore an object of the preferred embodiment is to provide a selectable one-way clutch which can prevent an unintentional engagement thereof.

SUMMARY OF THE INVENTION

Preferred embodiment relates to a selectable one-way clutch which comprising: a first annular plate and a second annular plate opposed to each other while being allowed to rotate relatively with each other; a first depression formed on an outer circumferential side of the first annular plate to be opposed to the second annular plate; a pawl held in the first depression in such a manner that a leading end thereof is allowed to reciprocate toward and away from the second annular plate; a second depression formed on an outer circumferential side of the second annular plate to be opposed to the first annular plate, into which the leading end of the pawl enters to be engaged therewith; an intermediate plate disposed between the first annular plate and the second annular plate while being allowed to rotate relatively with the first annular plate and the second annular plate; and an aperture formed on the intermediate plate, that is selectively overlapped with the first depression to selectively allow the pawl to project toward the second depression therethrough. In order to achieve the above-mentioned objective, according to the preferred embodiment, the pawl is provided with a strut that is pushed up toward the second depression through the aperture, a stopper plate protruding laterally from a rear end side of the strut, and a first inclined face formed on the stopper plate in such a manner to incline downwardly from the rear end side toward the leading end side of the strut. Meanwhile, the intermediate plate is provided with a side plate formed along each long side of the aperture to protrude toward the first annular plate. In addition, the side plate is provided with a second inclined face that is inclined in such a manner to be withdrawn from the first inclined face when the aperture is overlapped with the first depression to allow the strut enters into the second depression, and to be brought into contact to the first inclined face when the aperture is partially displaced from the first depression to push the strut integral with the stopper plate into the first depression. Specifically, the stopper plate of the pawl held in the first depression is overlapped with the side plate of the aperture of the intermediate plate, and the stopper plate is allowed to pivot within the first depression along the second inclined face of the side plate. That is, the stopper plate may serve as a fulcrum of pivotal movement of the pawl.

In the selectable one-way clutch according to the preferred embodiment, the pawl is pushed into the first depression to bring the first annular plate into disengagement from the second annular plate by rotating the intermediate plate in the direction to push the first inclined face by the second inclined face into the first depression. The intermediate plate may also be rotated by a drug torque or a frictional force resulting from rotating the second annular plate relatively with the first annular plate in a direction to allow the pawl to be projected toward the second depression. In this situation, however, the second inclined face of the intermediate plate blocks the first inclined face of the pawl to be pushed up. According to the preferred embodiment, therefore, an unintentional engagement of the first annular plate with the second annular plate can be prevented even if the intermediate plate is rotated unintentionally by the drug torque or the frictional force.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 4b is a top view partially showing the strut and the aperture from the notch plate side under the situation shown in FIG. 4a;

FIG. 5b is a top view partially showing the strut and the aperture from the notch plate side under the situation shown in FIG. 5a.

DETAILED DESCRIPTION OF THE PREFERRED EMBODIMENT(S)

Figure 1A:
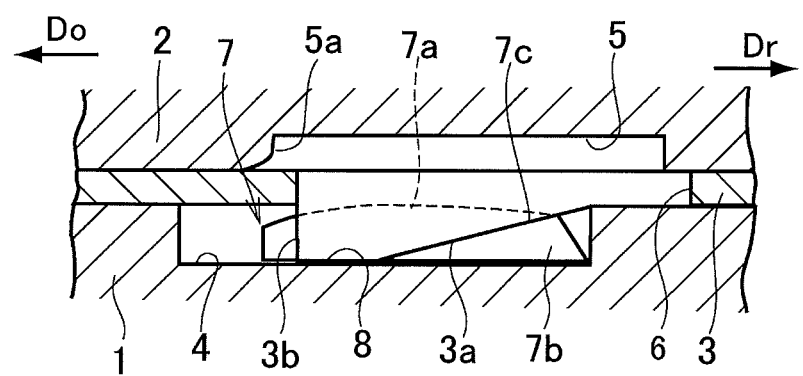
FIG. 1a is a cross-sectional view partially showing the strut and the aperture of the selectable one-way clutch according to the preferred embodiments.
Figure 6:
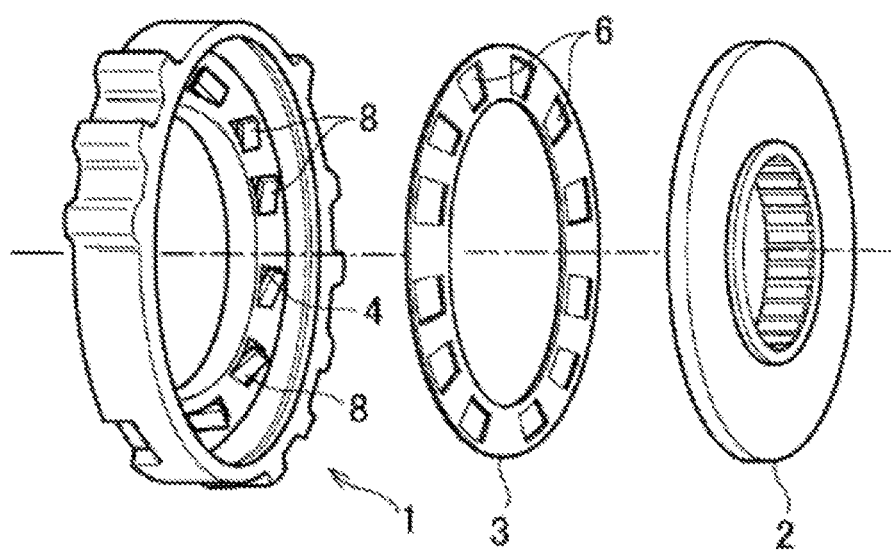
FIG. 6 is a perspective view showing the first and second depressions formed on the outer circumferential sides of the first and second annular plates, respectively.

A selectable one-way clutch (to be abbreviated as "SOWC" hereinafter) according preferred embodiments comprises a pocket plate 1 serving as the claimed first annular plate, a notch plate 2 serving as the claimed second annular plate, and a selector plate 3 arranged between those plates 1 and 2 serving as the claimed control plate. Referring now to FIG. 1a, there is shown a partial cross-section of the SOWC. As shown in FIG. 1a, a plurality of pockets 4 (only one of them is shown in FIG. 1a) serving as the claimed first depression (FIG. 6) are formed in a circular manner on an radially outer side of one face of the pocket plate 1 opposed to the notch plate 2. A circumferential length of each pocket 4 is longer than a radial width. On the other hand, a plurality of notches 5 (only one of them is shown in FIG. 1a) serving as the second depression (FIG. 6) are also formed in a circular manner on an radially outer side of one face of the notch plate 2 in such a manner to be opposed individually to the pocket 4. A circumferential length of each notch 5 is also longer than a radial width. The selector plate 3 is also an annular disk or a ring plate which is allowed to be rotated between the pocket 4 and the notch 5, and a plurality of apertures 6 each of which has a similar shape as that of the opening of the pockets 4 are formed on the selector plate 3 in such a manner to be opposed to each pocket 4.

Figure 1B:
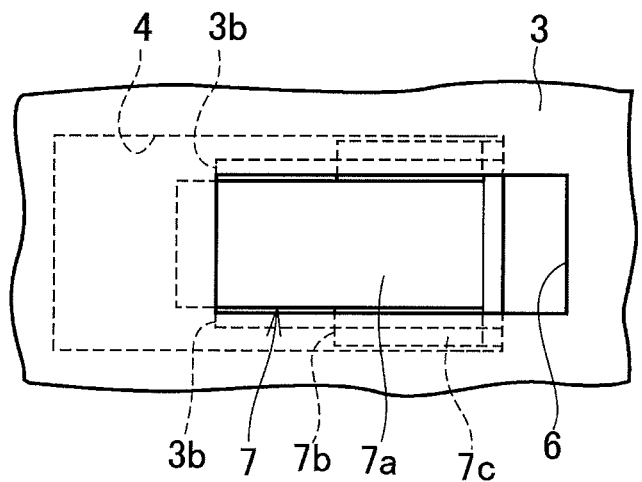
FIG. 1b is a top view partially showing the strut and the aperture from the notch plate side.
Figure 2:
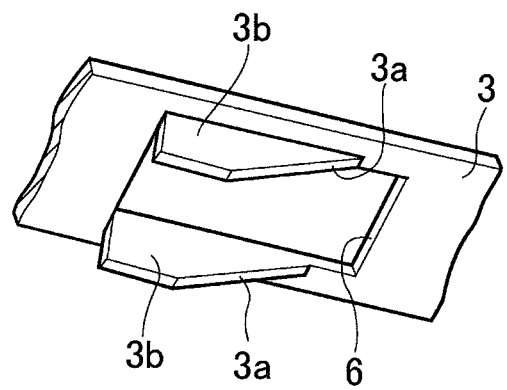
FIG. 2 is a perspective view schematically showing the strut and the selector plate.
Figure 2:
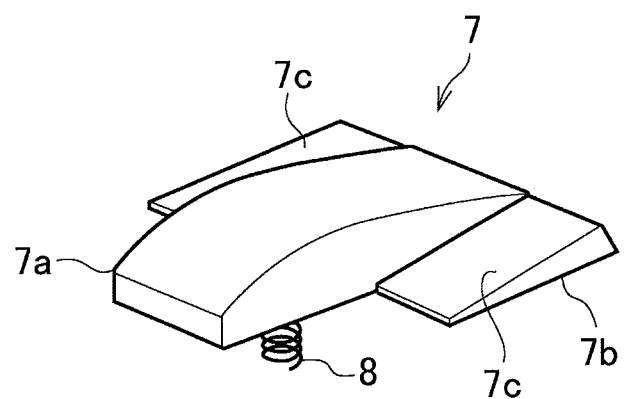

A pawl 7 is individually held in each pocket 4. In order to selectively enable torque transmission between the pocket plate 1 and the notch plate 2, a leading end portion of the pawl 7 is allowed to be pushed out of the pocket 4 toward the notch plate 2. A fundamental structure of the SOWC of the preferred embodiments is similar to that described in JP-A-2014-526658, and hence detailed explanation thereof will be omitted. Turning to FIG. 2, there is shown an example of the pawl 7 of the SOWC according to the preferred embodiments. As illustrated in FIG. 2, the pawl 7 comprises a strut 7a and a stopper plate 7b. The strut 7a is formed into a rectangular shape which is substantially congruent with but slightly smaller than a profile of the opening of aperture 6. The strut 7a has a flat bottom surface (i.e., a surface facing to the bottom of the pocket 4) and a convex upper surface (i.e., a surface facing to the opening of the pocket 4). The stopper plate 7b is laterally protruded from a rear side of each side face of the strut 7a. The stopper plate 7b is held in the pocket 4 below the selector plate 3 while keeping a predetermined space therearound so that the pawl 7 is allowed to pivot around the stopper plate 7b in the pocket 4. The pocket 4 holding the stopper plate 7b is partially closed by the selector plate 3 to prevent exiting of the stopper plate 7b from the pocket 4 by a pivotal movement of the pawl 7. Specifically, the stopper plate 7b protrudes laterally from each side face of the strut 7a within a range from a rear end (i.e., a right end of FIGS. 1a and 1b) to an intermediate portion, and a thickness thereof is reduced gradually from the rear end side toward the intermediate portion. That is, an upper face 7c of the stopper plate 7b is inclined downwardly from the rear end toward an leading end and hence a clearance from the selector plate 3 is widened gradually toward the leading end of the stopper plate 7b. Specifically, a thickness of the rear end side of the stopper plate 7b is substantially identical to that of the strut 7a, and decreases gradually therefrom toward the leading end side of the strut 7a. Accordingly, the upper face 7c of the stopper plate 7b thus inclined serves as the claimed first inclined face.

An elastic member (e.g., a spring) 8 is interposed between a bottom face of the pocket plate 4 and a bottom face of the leading end of the pawl 7 to push up the strut 7a toward the notch plate 2.

As depicted in FIG. 2, a pair of side plates 3b is formed on each long side of the aperture 6 of the selector plate 3 to protrude toward the pocket plate 1, and an inclined face 3a whose inclination is substantially identical to that of the upper face 7c of the stopper plate 7b is formed individually on the rear end side of each side face 3b. Accordingly, the inclined face 3a serves as the claimed second inclined face. A clearance between the side plates 3b is substantially identical to a width of the stopper plate 7b, and the inclined face 3a is formed on a lower face (facing to the pocket 4) of each side plate 3b from one of the longitudinal ends to an intermediate portion. Each inclined face 3a is brought into contact almost parallel to the upper plate 7c of the stopper plate 7b to push the pawl 7 into the pocket 4. To this end, a height of each side plate 3b (in a depth direction of the pocket 4) is highest at the leading end side of the pawl 7, and decreased gradually therefrom toward the rear end portion of the pawl 7. That is, the inclined face 3a is inclined from the bottom side of the pocket 4 toward the opening end side of the pocket 4. Positions, lengths, and inclinations of the inclined face 3a and the upper plate 7c are determined in such a manner to achieve the below-mentioned actions.

The notches 5 each of which is a rectangular depression are formed on the notch plate 2 at positions to be opposed individually to the pockets 4 so that the leading end portion of the pawl 7 is pushed into the notch 5 by the elastic member 8. As the shoulder described in JP-A-2014-526658, a corner between a surface of the notch plate 2 and a front inner face of the notch 5 is rounded to form an engagement wall 5a to be brought into abutment to the leading end of the strut 7a.

The selector plate 3 is held between the pocket plate 1 and the notch plate 2 while being allowed to rotate in both rotational directions within a predetermined angle. For example, the selector plate 3 may be rotated by an electromagnetic actuator (solenoid) and a spring (both not shown). Specifically, the selector plate 3 is always pushed in one of the rotational directions by the spring to be brought into abutment to a not shown stopper. In this situation, the pawl 7 is pushed into the pocket 4 of the pocket plate 1 by the inclined face 3a of the side plate 3b. When the selector plate 3 is pushed by the actuator in the opposite direction, a pushing force of the side plate 3b being applied to the pawl 7 is cancelled so that the leading end of the strut 7a is pushed out of the pocket 4 toward the notch 5 by the elastic member.

Here will be explained actions of the SOWC thus structured. Turning to FIGS. 1a and 1b, there are shown the SOWC in disengagement. In this situation, the pocket plate 1 and the notch plate 2 are allowed to be rotated relatively in both ratchet direction Dr and overrunning direction Do. Specifically, the SOWC is brought into disengagement by rotating the selector plate 3 in the ratchet direction Dr in such a manner to displace each aperture 6 with respect to each pocket 4 so that the leading end of the strut 7a is covered by the selector plate 3. Consequently, the inclined faces 3a formed on the bottom face of the selector plate 3 along both long sides of the apertures 6 are brought into contact with the upper plate 7c of the stopper plate 7b thereby pushing the strut 7a into the pocket 4. That is, a moment of the selector plate 3 being pushed by the aforementioned not shown spring counterclockwise in FIG. 1(a) is applied to the stopper plate 7b as a pushing load established by each inclined face 3a to push the pawl 7 into the pocket 4. Consequently, the pawl 7 pivots in such a manner that a bottom face thereof comes into almost contact to the bottom face of the pocket 4. In this situation, the elastic member 8 is compressed by the strut 7a thus being pushed into the pocket 4 so that the pocket plate 1 and the notch plate 2 can be rotated in both the ratchet direction Dr and the overrunning direction Do without transmitting a large torque therebetween.

When the notch plate 2 is rotated in the ratchet direction Dr (i.e., in the right direction in FIGS. 1a and 1b) in the SOWC in disengagement, the selector plate 3 may be rotated in the same direction by a drag torque through lubrication oil applied therebetween. In this situation, however, each inclined face 3a is brought into abutment to the upper face 7c of the stopper plate 7b and hence further rotation of the selector plate 3 in the ratchet direction Dr is prevented. Consequently, the pawl 7 can be kept in the pocket 4. According to the preferred example, therefore, the pawl 7 can be prevented from being allowed to rise by the drug torque to unwillingly bring the pocket plate 1 into engagement with the notch plate 2 even when the notch plate 2 is rotated in the ratchet direction Dr.

Figure 3A:
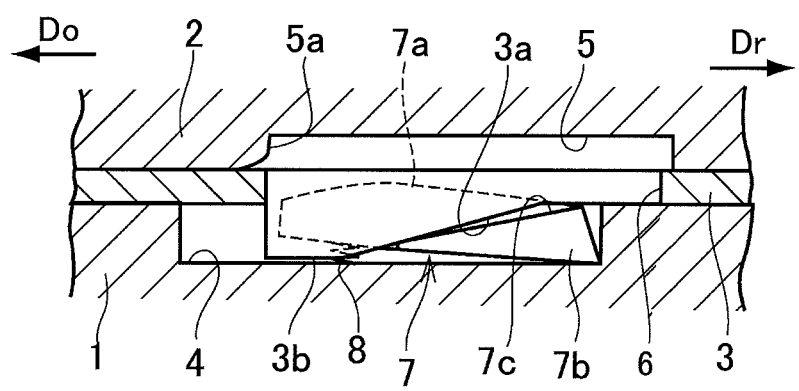
FIG. 3a is a cross-sectional view partially showing a transitional state during bringing the pocket plate into engagement with the notch plate.

In the SOWC, the pocket plate 1 can be brought into engagement with the notch plate 2 by rotating the selector plate 3 in the overrunning direction Do (i.e., toward the left side in FIG. 1) within a predetermined range. A movement of the pawl 7 to bring the pocket plate 1 into engagement with the notch plate 2 will be explained with reference to FIGS. 3a, 3b and 4a, 4b. As a result of such rotation of the selector plate 3 in the overrunning direction Do, an overlapping area between the selector plate 3 and the pocket 4 is reduced and the inclined face 3a is detached from the upper face 7c of the stopper plate 7b. Consequently, only a thick side of each inclined face 3a of the side plate 3b remains in contact with the tapered leading end of the stopper plate 7b as illustrated in FIG. 3a. In this situation, a reading end of the pawl 7 is pushed up by the elastic member 8 from the bottom toward the notch plate 2. That is, a pivotal movement of the pawl 7 is achieved around the stopper plate 7b held in the pocket 4 while being covered by the selector plate 3. Specifically, a bottom corner of the thickest portion of the stopper plate 7b serves as a fulcrum of such pivotal movement of the pawl 7. For this reason, a strength of the fulcrum of the pivotal movement of the pawl 7 can be ensured sufficiently so that the pawl 7 can be lasted longer.

Figure 3B:
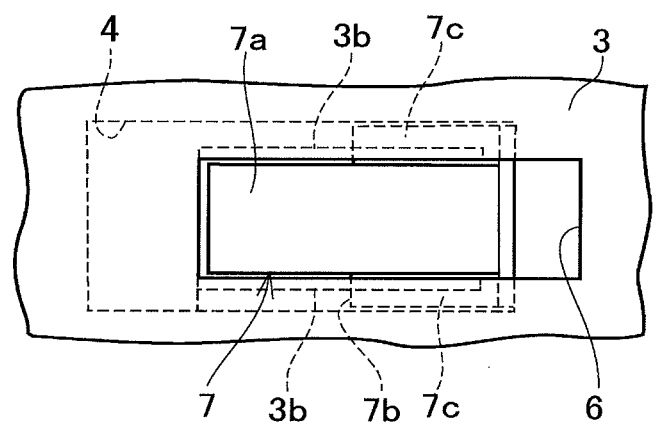
FIG. 3b is a top view partially showing the strut and the aperture from the notch plate side under the transitional state.
Figure 4A:
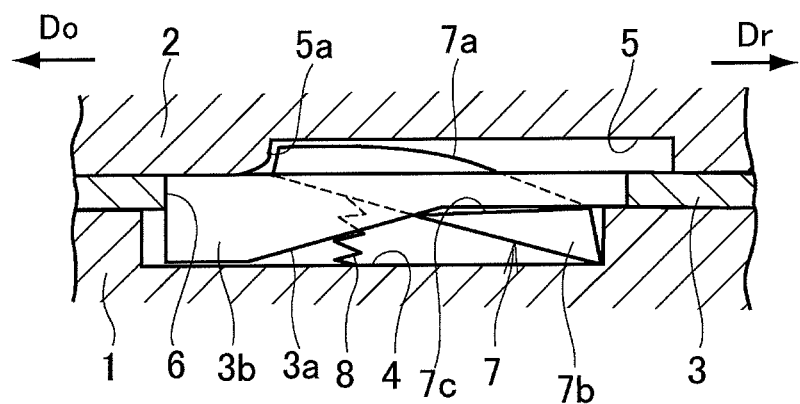
FIG. 4a is a cross-sectional view partially showing further progression of the engagement between the pocket plate and the notch plate.
Figure 4B:
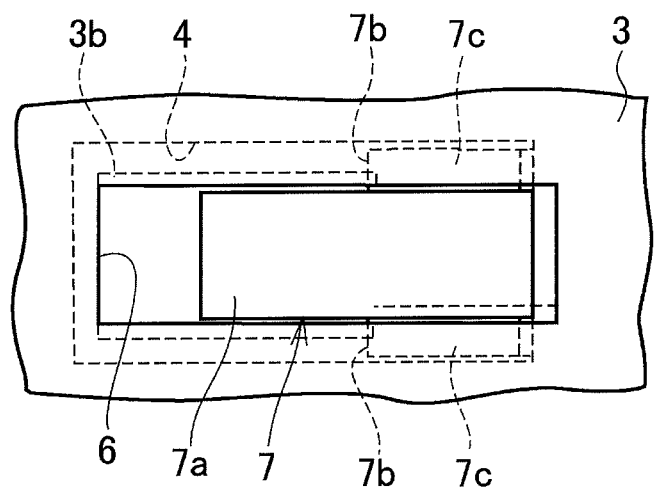

When the aperture 6 is overlapped entirely with the pawl 7, the pocket 4 is opened completely so that the strut 7a of the pawl 7 is exposed to the notch plate 2, as illustrated in FIGS. 3a and 3b. In this situation, the leading end of the strut 7a of the pawl 7 is partially pushed into the aperture 6, but further rise of the pawl 7 is prevented by the inclined face 3a at a relatively thick portion of the side plate 3b being in contact with the leading end of the upper face 7c of the stopper plate 7b.

Figure 5A:
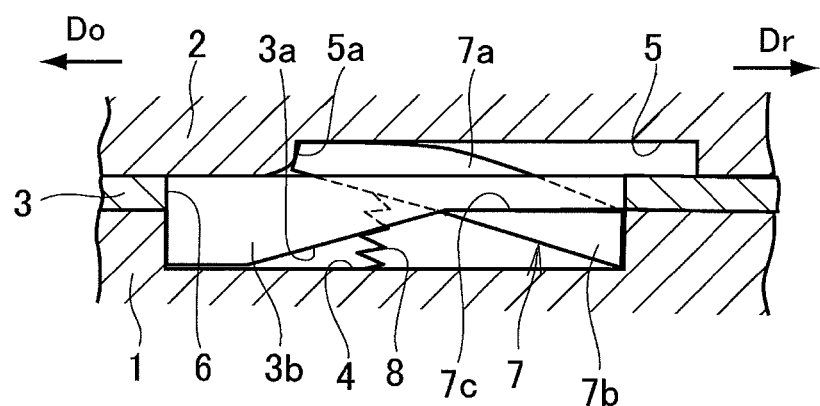
FIG. 5a is a cross-sectional view partially showing the pocket plate and the notch plate in engagement.
Figure 5B:
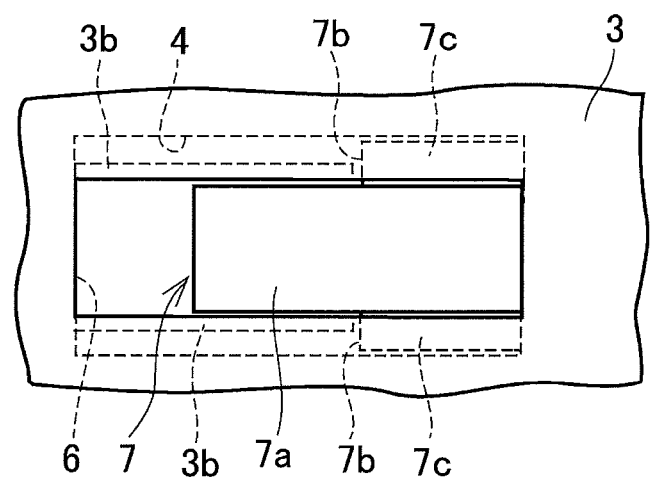

When the selector plate 3 is further rotated in the overrunning direction Do, the overlapped area between the inclined face 3a of the side plate 3b and the upper face 7c of stopper plate 7b is further reduced. Specifically, only the inclined face 3a at a thinner side of the side plate 3b remains overlapped with the upper face 7c of stopper plate 7b. Consequently, a pivotal angle of the pawl 7 integral with the stopper plate 7b is increased with such reduction in the thickness of the inclined face 3a so that the leading end of the pawl 7 is allowed to be projected to the notch plate 2 through the aperture 6. Then, when the notch 5 of the notch plate 2 being rotated reaches above the strut 7, the leading end of the strut 7a of the pawl 7 is allowed to be pushed into the notch 5. Eventually, when the leading end of the side plate 3b of the selector plate 3 comes into abutment to the inner wall of the pocket 4 as illustrated in FIGS. 5a and 5b, the inclined face 3a is substantially withdrawn from the upper face 7c of the stopper plate 7b so that the leading end of the strut 7a being pushed up is brought into contact to the engagement wall 5a of the notch 5.

In this situation, if the notch plate 2 is rotated in the ratchet direction Dr relatively with the pocket plate 1, the engagement wall 5a of the notch 5 is stopped by the leading end of the strut 7a of the pawl 7 so that the notch plate 2 is brought into engagement with the pocket plate 1 through the pawl 7 to enable torque transmission therebetween. To the contrary, if the notch plate 2 is rotated in the overrunning direction Do relatively with the pocket plate 1, the engagement wall 5a of the notch 5 is detached from the leading end of the strut 7a of the pawl 7, and an opening edge of the notch 5 opposite to the engagement wall 5a is brought into contact to an upper face (or a rear face) of the strut 7a of the pawl 7. Consequently, the pawl 7 is pushed into the pocket 4 so that the notch plate 2 is allowed to be rotated in the overrunning direction Do relatively with the pocket plate 1 while passing over the pawl 7. That is, the notch plate 2 is brought into disengagement from the pocket plate 1 again without causing a torque transmission therebetween.

Thus, according to the preferred embodiment, the ratchet direction Dr is a direction in which the torque transmission between the pocket plate 1 and the notch plate 2 through the pawl 7 is enabled. By contrast, the overrunning direction Do is a direction in which the notch plate 2 is allowed to rotate relatively with the pocket plate 1 while pushing the pawl 7 into the pocket 4.

If the notch plate 2 is rotated relatively with the pocket plate 3 in the overrunning direction Do the selector plate 3 may also be rotated in the opposite direction by the aforementioned drug torque and hence the strut 7a of the pawl 7 is pushed up toward the notch plate 2. However, since the drag torque is caused by a relative rotation of the notch plate 2 with respect to the pocket plate 1 to the overrunning direction Do, torque transmission between the notch plate 2 and the pocket plate 1 will not occur unintentionally.

It is understood that the invention is not limited by the exact construction of the foregoing preferred embodiments, but that various modifications on the shapes of the stopper plate and the upper face thereof, and the shapes of the side plate and the inclined face may be made without departing from the scope of the inventions. For example, a bottom face of the stopper plate may be inclined to increase a thickness thereof. In this case, the bottom face of the pocket may be depressed to hold the bottom face of the stopper plate. Further, the SOWC of the preferred embodiments may be functioned as a one-way clutch by connecting the pocket plate and the notch plate to a predetermined rotary member respectively, and as a one-way brake by connecting either one of the plate to a fixed member.

What is claimed is:

1. A selectable one-way clutch, comprising:
    a first annular plate and a second annular plate opposed to each other while being allowed to rotate relatively with each other;
    a first depression formed on an outer circumferential side of the first annular plate to be opposed to the second annular plate;
    a pawl held in the first depression in such a manner that a leading end thereof is allowed to reciprocate toward and away from the second annular plate;
    a second depression formed on an outer circumferential side of the second annular plate to be opposed to the first annular plate, into which the leading end of the pawl enters to be engaged therewith;
    an intermediate plate disposed between the first annular plate and the second annular plate, and configured to rotate relative to the first annular plate and the second annular plate; and
    an aperture formed on the intermediate plate, that is selectively overlapped with the first depression to selectively allow the pawl to project toward the second depression therethrough;
    wherein the pawl comprises a strut that is pushed toward the second depression through the aperture, a stopper plate protruding laterally from a rear end side of the strut, and a first inclined face formed on the stopper plate in such a manner to incline downwardly from the rear end side toward the leading end side of the strut;
    wherein the intermediate plate comprises a side plate formed along each long side of the aperture to protrude toward the first annular plate; and
    wherein the side plate comprises a second inclined face that is inclined in such a manner to be withdrawn from the first inclined face when the aperture is overlapped with the first depression to allow the strut to enter into the second depression, and to be brought into contact with the first inclined face when the aperture is partially displaced from the first depression to push the strut integral with the stopper plate into the first depression.

2. The selectable one-way clutch as claimed in claim 1, wherein the stopper plate of the pawl held in the first depression is overlapped with the side plate of the aperture of the intermediate plate, and
    wherein the stopper plate is allowed to pivot within the first depression along the second inclined face of the side plate.

3. The selectable one-way clutch as claimed in claim 2, wherein the stopper plate serves as a fulcrum of pivotal movement of the pawl.

* * * * *